United States Patent [19]

McLaughlin et al.

[11] Patent Number: 4,865,696
[45] Date of Patent: Sep. 12, 1989

[54] RECOVERY OF METAL CHLORIDES FROM THEIR COMPLEXES BY MOLTEN SALT DISPLACEMENT

[75] Inventors: David F. McLaughlin, Oakmont; Richard A. Stoltz, Murrysville Boro, both of Pa.

[73] Assignee: Westinghouse Electric Corp., Pittsburgh, Pa.

[21] Appl. No.: 242,563

[22] Filed: Sep. 12, 1988

[51] Int. Cl.$^4$ .................. B01D 3/00; C01G 25/04; C01G 27/04

[52] U.S. Cl. .................. 203/29; 203/39; 203/42; 203/DIG. 16; 203/DIG. 25; 23/945; 204/64 T; 204/130; 423/76; 423/492

[58] Field of Search .................. 203/29, 39, DIG. 25, 203/DIG. 16, 50, 51, 42; 423/73, 76, 492, 72, 78, 77; 204/64 T, 130; 75/84.5; 23/294; 55/72, 82

[56] References Cited

U.S. PATENT DOCUMENTS

| | | | |
|---|---|---|---|
| 1,582,860 | 4/1926 | Van Arkel et al. | 423/73 |
| 2,602,725 | 7/1952 | Wilhelm et al. | 423/489 |
| 2,695,213 | 11/1954 | Fernelius | 423/492 |
| 2,744,060 | 5/1956 | Eaton | 203/50 |
| 2,816,814 | 12/1957 | Plucknett | 203/71 |
| 2,852,446 | 9/1958 | Bromberg | 203/1 |
| 2,928,722 | 3/1960 | Scheller | 203/51 |
| 2,938,769 | 5/1960 | Overholser | 423/70 |
| 3,006,719 | 10/1961 | Miller | 423/70 |
| 3,600,284 | 8/1971 | Martinez | 204/39 |
| 3,671,186 | 6/1972 | Ishizuka | 423/73 |
| 3,966,458 | 6/1970 | Spink | 75/84.5 |
| 4,021,531 | 5/1977 | Besson et al. | 423/73 |
| 4,578,252 | 3/1986 | Pastor et al. | 423/77 |
| 4,737,244 | 4/1988 | McLaughlin | 203/51 |
| 4,749,448 | 6/1988 | Stoltz | 203/51 |

FOREIGN PATENT DOCUMENTS 2543162 9/1984 France.
788241 3/1957 United Kingdom.

OTHER PUBLICATIONS

Vinarov: Modern Methods of Separating Zirconium and Hafnium; Russian Chemical Reviews, Vol. 36, No. 7, Jul., 1967, pp. 522–536.
Plucknett, AEC Report ISC-51-1949.
Mackenzie & Murphy; J. Chem. Phys. 33366, 1960.
Williams; U.S. AEC Report NY00-1009, Aug., 1950.
Niselson (Sbornik, Rasdeleniye Blizkikh po Svoistvam Redkikn Metallov, 1962, p. 168 Flengas & Pnt; Can. Metall. Qunt, 8, 151, 1969.

Primary Examiner—Wilbur Bascomb
Attorney, Agent, or Firm—R. A. Stoltz

[57] ABSTRACT

This is a process for removing phosphorus oxychloride from a complex of zirconium or hafnium chloride and phosphorus oxychloride utilizing a lithium-potassium chloride molten salt absorber vessel displacing phosphorous oxychloride from the complex, with a condenser which has the complex of zirconium or hafnium chloride and phosphorus oxychloride as the condensing fluid to scrub zirconium or hafnium chloride from the phosphorus oxychloride vapor released from the complex. The process uses at least one separate vessel to strip the zirconium or hafnium chloride from the lithium-potassium chloride molten salt.

9 Claims, 1 Drawing Sheet

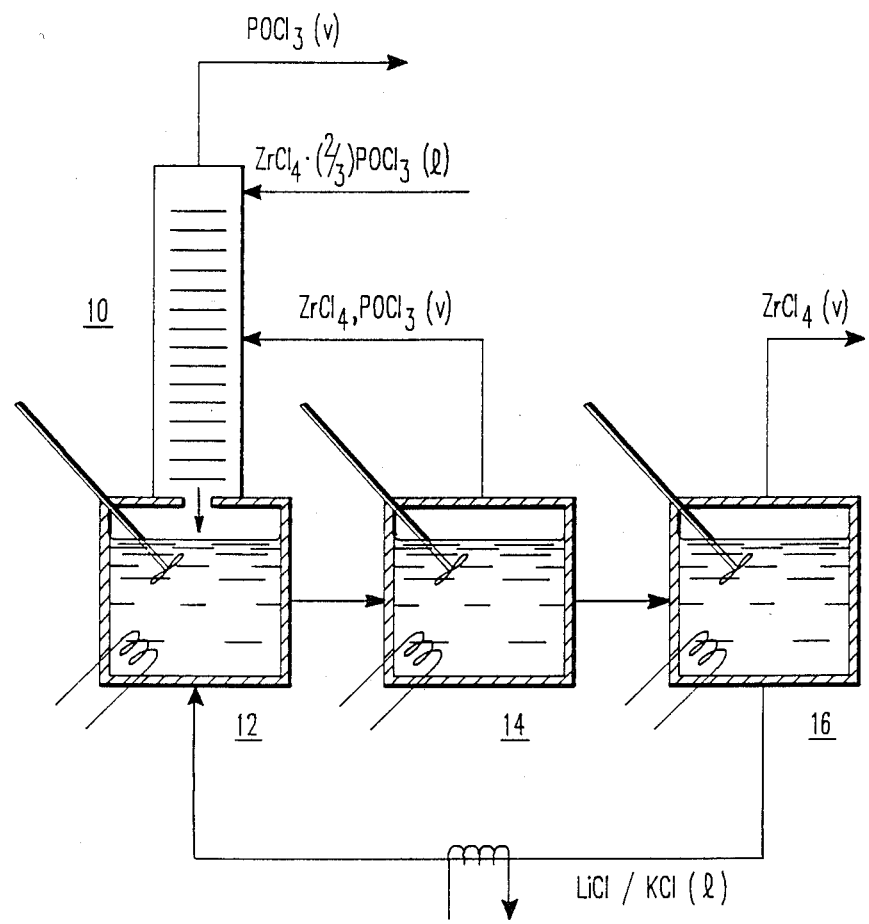

RECOVERY OF METAL CHLORIDES FROM THEIR COMPLEXES BY MOLTEN SALT DISPLACEMENT

CROSS-REFERENCE TO RELATED APPLICATIONS

A process for zirconium-hafnium separation is described in related application Ser. No. 242,574, filed Sept. 12, 1988 and assigned to the same assignee. That related application utilizes a complex of zirconium-hafnium chlorides and phosphorus oxychloride prepared from zirconium-hafnium chlorides with the complex of zirconium-hafnium chlorides and phosphorus oxychloride being introduced into a distillation column and a hafnium chloride enriched stream is taken from the top of the column and a zirconium enriched chloride stream is taken from the bottom of the column, and in particular with prepurifying said zirconium-hafnium chlorides prior to introduction of said complex into a distillation column to substantially eliminate iron chloride from the zirconium-hafnium chlorides, whereby buildup of iron chloride in the distillation column is substantially eliminated and the column can be operated in a continuous, stable manner.

An improved process for prepurification of zirconium-hafnium chlorides prior to preparation of a complex of zirconium-hafnium chlorides and phosphorus oxychloride for use in a distillation column for zirconium-hafnium separation is described in related application Ser. No. 242,572, filed Sept. 12, 1988 and assigned to the same assignee. That related application utilizes prepurification of zirconium-hafnium chlorides prior to complexing with phosphorus oxychloride by passing the zirconium-hafnium chloride through an essentially oxygen-free molten salt purification-sublimation system, and at least periodically removing iron chloride from the molten salt purification-sublimation system by electrochemically plating iron out of molten salt purification-sublimation system. The molten salt in the molten salt purification-sublimation system consisting essentially of a mixture of alkali metal and alkaline earth metal chlorides, zirconium-hafnium chlorides and impurities.

A process for zirconium-hafnium separation is described in related application Ser. No. 242,571, filed Sept. 12, 1988 and assigned to the same assignee. That related application utilizes a complex of zirconium and hafnium chlorides and phosphorus oxychloride introduced into a distillation column, with a hafnium chloride enriched stream of complex is taken from the top of the column and a zirconium enriched chloride stream of complex is taken from the bottom of the column, followed by reduction of the zirconium or hafnium chloride from complex taken from the distillation column by electrochemically plating zirconium or hafnium out of a molten salt bath with the molten salt in the molten salt bath consisting principally of a mixture of alkali metal and alkaline earth metal chlorides and zirconium or hafnium chloride.

A process for zirconium-hafnium separation is described in related application Serial No. 242,570, filed Sept. 12, 1988 and assigned to the same assignee. That related application utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride taken from the bottom of distillation column is provided by electrochemically reducing zirconium from the molten salt solvent. A pressurized reflux condenser is used on the top of the column to add hafnium chloride to the previously stripped molten salt solvent which is being circulated back to the top of the column.

A process for zirconium-hafnium reduction (and possibly in combination with separation) is described in related application Ser. No. 242,564, filed Sept. 12, 1988 and assigned to the same assignee. That related application utilizes reduction to metal of the zirconium and/or hafnium chloride taken from a distillation column by electrochemically reducing an alkaline earth metal in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Ser. No. 242,573, filed Sept. 12, 1988 and assigned to the same assignee. That related application utilizes placing nickel-containing zirconium in a molten salt bath with the molten salt in the molten salt bath consisting principally of a mixture of at least two alkali metal fluorides to produce a molten salt bath containing dissolved zirconium and dissolved nickel, electrochemically plating the nickel from the molten salt bath at a voltage sufficient to plate nickel but less than the voltage to plate zirconium to provide an essentially nickel-free molten salt bath; and electrochemically reducing the zirconium from the essentially nickel-free molten salt bath to provide an essentially nickel-free zirconium.

All of the above-related applications are owned by the same assignee and are hereby incorporated by reference herein.

BACKGROUND OF THE INVENTION

This invention relates to separation of zirconium and hafnium chloride and in particular relates to separating zirconium or hafnium from a phosphorous oxychloride complex after distillation has separated the hafnium and zirconium.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction generally as described in U.S. Pat. No. 3,006,719, issued to Miller on October 31, 1961.

Several other processes have been suggested for separation of the zirconium-hafnium tetrachloride (Zr,Hf)Cl₄ generated from the ore by carbochlorination. The use of a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972 utilizes a series of dissolution and evaporation stages with a solvent such as sodium chloride. U.S. Pat. No. 4,021,532 issued to Besson on Apr. 3, 1977, utilizes extractive distillation with an alkali metal chloride and aluminum (or iron) chloride mixture as the solvent. Extractive distillation of zirconium-hafnium tetrachloride with a pure zinc chloride solvent has been attempted (Plucknett et al., U.S. AEC Report ISC-51, 1949), but was unsuccessful due to the formation of a highly viscous two-phase system. The anomalously high viscosity of zinc chloride is described by MacKenzie and Murphy (J. Chem. Phys., 33, 366, 1960). U.S. Pat. No. 4,737,244 to McLaughlin et al. describes an extractive distillation method for separating hafnium from zirconium of the type wherein a mixture of zirconium and hafnium tetrachlorides is introduced into a distillation column, with a recirculating molten salt solvent in the column to provide a liquid phase, and the improvement comprising having a molten salt solvent composition of at least 30 mole percent zinc chloride and at least 10 mole percent of lead chloride.

A process for zirconium-hafnium separation is described in U.S. Patents 4,737,244 and 4,749,448 issued to McLaughlin et al. and to Stoltz et al. These patents provide for zirconium-hafnium separation by extractive distillation with the molten solvent containing zinc chloride and a viscosity reducer.

Of all of the molten salt distillation processes, only the above-mentioned Besson process with a potassium chloride-aluminum chloride solvent has been brought to commercial development. This process is currently in use in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500C) temperatures are required. Aluminum chloride in excess of 1:1 molar to alkali metal chloride is required and there is considerable carry-over of aluminum chloride into the zirconium tetrachloride leaving the stripper. French patent No. 2,543,162 (9-28-84) to Brun and Guerin describes a post-stripping process for removing aluminum chloride. In addition, it should be noted that aluminum chloride is an especially hygroscopic and corrosive molten salt, and, at higher temperatures, is very difficult to handle.

Another separation process involves fractionation of the chemical complex formed by the reaction of (Zr,Hf)Cl₄ with phosphorus oxychloride (POCl₃) This technique was patented in 1926 by van Arkel and de Boer (U.S. Pat. No. 1,582,860), and was based on the approximately 5C boiling point difference between the hafnium and zirconium complex pseudoazeotropes, having the nominal compositions 3(Zr,Hf)Cl₄: 2POCl₃. This composition may be produced by direct reaction between liquid phosphorus oxychloride and the crude zirconium-hafnium tetrachloride obtained from opening of the ore.

Extensive work (e.g. Williams et al., U.S. AEC Report NYOO-1009, August 1950) was done on the zirconium-hafnium tetrachloride complex with phosphorus oxychloride in the early 1950s, utilizing generally the molten salt distillation process of the aforementioned U.S. Pat. No. 1,582,860 of van Arkel and de Boer. While this extensive effort did provide some separation, the process was difficult to control, and both the reboiler liquid volatility and the Hf/Zr separation factor degraded significantly with time. Despite the extensive investment in time and money, this approach was abandoned and the U.S. effort was concentrated on the liquid-liquid extraction described in the above-mentioned U.S. Pat. No. 2,938,769 of Overholser. The liquid-liquid extraction remains the only commercially utilized process for zirconium-hafnium separation in the United States today.

SUMMARY OF THE INVENTION

This is a process for removing phosphorus oxychloride from a complex of zirconium or hafnium chloride and phosphorus oxychloride after zirconium and hafnium chlorides have been separated by distillation. It utilizes a lithium-potassium chloride molten salt absorber vessel with a condenser which uses the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the lithium-potassium chloride molten salt. This process recovers zirconium chloride from a complex of zirconium chloride and phosphorus oxychloride. The process comprises introducing a liquid stream of the complex into an upper portion of a feed column containing phosphorus oxychloride vapor and zirconium chloride vapor, to absorb zirconium chloride vapor into the liquid stream and produce a bottoms liquid and also produce phosphorus oxychloride vapor stripped of zirconium chloride; introducing the bottoms liquid into a molten salt-containing displacement reactor, the molten salt comprising at least 30 mole percent lithium chloride and at least 30 mole percent of at least one other alkali metal chloride, the reactor being heated to 300–450C to displace phosphorus oxychloride and produce phosphorus oxychloride vapor and zirconium chloride vapor, and also produce zirconium chloride-containing molten salt; introducing the phosphorus oxychloride vapor and the zirconium chloride vapor into the feed column; introducing the zirconium chloride-containing molten salt into a recovery vessel where zirconium chloride is removed from the molten salt to produce zirconium chloride product and zirconium chloride-depleted molten salt; recycling the zirconium chloride-depleted molten salt to the displacement reactor; and collecting phosphorus oxychloride vapor stripped of zirconium chloride from the feed column. The process can also recover hafnium chloride from a hafnium chloride containing (rather than zirconium chloride containing) complex.

Preferably a secondary displacement vessel is used with the zirconium or hafnium chloride-containing molten salt from the displacement reactor being run through the secondary displacement vessel to produce a vapor portion and a liquid portion of the zirconium or hafnium chloride containing molten salt, with the vapor portion being recycled to the feed column and the liquid portion being introduced into the recovery vessel.

The zirconium or hafnium chloride may be sublimed from the recovery vessel or may be recovered from the recovery vessel by electrolysis. Preferably the feed column is operated at about 250C, the displacement reactor is operated at about 450C, and the secondary displacement vessel is operated as about 500C. When subliming the recovery vessel is preferably operated at about 550C, and the molten salt preferably consists essentially of lithium chloride, at least one of sodium and potassium chloride, zirconium chloride. Up to 30 mole percent of magnesium or calcium chloride may also be added. When recovering by electrolysis, the recovery vessel is preferably operated at 300–450C in one embodiment. In another embodiment the molten salt contains at least 30 mole percent of at least one of rubidium and cesium (although sodium and/or potassium can also be used) and the vessel is operated at 600–750C.

BRIEF DESCRIPTION OF THE DRAWINGS

The lone FIGURE is a schematic diagram of the process.

DESCRIPTION OF THE PREFERRED EMBODIMENTS

One of the principal problems with the distillation of oxychlorides approach is the recovery of zirconium from the hafnium-depleted complex salt in such a way that the residual phosphorus content is low enough for nuclear applications, typically 10–50 ppm. A considerable number of processes have been investigated for "cracking" this complex. Williams et al. (U.S. AEC Report NYOO-1009, 1950) attempted a series of techniques aimed at aqueous precipitation of phosphorus-free $ZrO_2$, but with limited success. The necessity of converting the tetrachloride to the oxide also negates much of the inherent advantages associated with using a non-aqueous, tetrachloride-based separations process, namely process simplification, absence of the need for a second chlorination step before reduction, and elimination of both consumable reagents and waste streams.

Two non-aqueous processes were subsequently patented which recover $ZrCl_4$ from the $POCl_3$ complex In the first (Fernelius, U.S. Pat. No. 2,695,213, 1954), the closely related $PCl_5$ complex was heated with elemental magnesium or phosphorus, producing a mixture of $ZrCl_4$ and $PCl_3$, which may be separated by distillation. Although the patent indicated that a similar process could be used to dissociate the $POCl_3$ complex, the reaction products were not identified. In a similar process (Broadley, British Patent No. 788,241, 1957), hot carbon was used to accomplish the same conversion. Both processes consume reagents, and require chemical reconversion of $PCl_3$ to $POCl_3$ before recycle is possible.

Nisel'son (Sbornik Rasdeleniye Blizkikh po Svoistvam Redkikh Metallov, 1962, p. 168) described a laboratory procedure by which the solid complex salt was heated with solid NaCl. At 300–400C, reaction occurred to form molten $Na_2ZrCl_6$ with evolution of $POCl_3$ vapor; the zirconium tetrachloride was then recovered by vacuum calcining of the resultant mixture at 700C. Phosphorus levels of 30–50 ppm on a metal basis were reported. Attempts to duplicate Nisel'son's experiments have demonstrated significant difficulties with this approach, however. The molten $Na_2ZrCl_6$ complex is highly corrosive at 700C, leading to high levels of impurity metals in the recovered zirconium tetrachloride. While the low phosphorus levels were confirmed, high sodium content was also observed, making the final product unsuitable for reduction to nuclear grade metal even in the absence of corrosion product impurities.

While Nisel'son's approach overcomes several of the difficulties with the previously patent processes in that it recycles the $POCl_3$ without subsequent chemical reactions, and maintains the $ZrCl_4$ in a strictly nonaqueous environment, the high stability of the sodium chloride double salt requires very high temperatures to dissociate and recover the product. The melting point of both NaCl and $Na_2ZrCl_6$ are such that much of the process must be carried out between solids and liquids, making adaptation to continuous processing difficult.

The present invention provides an alternate solution to recovery of zirconium tetrachloride from the $POCl3$ distillation complex, producing a low-phosphorus product from a liquid-phase reagent suitable for continuous processing, and at considerably lower temperatures at which corrosion is minimized. Instead of using solid NaCl as the reagent, a mixture of alkali metal chlorides is used, blended in such proportions as to form a low-melting-point eutectic or near-eutectic mixture. All of the alkali metal chlorides (LiCl, NaCl, KCl, RbCl, CsCl) are known to form double salts with zirconium tetrachloride, with the stability of the complex increasing with the molecular weight of the alkali metal chloride (Flengas and Pint, Can. Metall. Quart., 8 151, 1969). In addition, complexes also exist with the alkaline earth metal chlorides $SrCl_2$ and $BaCl_2$; the theoretical complexes formed with the lower molecular weight members of this group ($MgCl_2$ and $CaCl_2$) are apparently too unstable to exist as pure compounds.

A number of low-melting eutectics are therefore available by judicious selection of chlorides, such that the displacement reagent may be handled in the molten form rather than the solid. In addition, the reactivity of the solvent towards $Zr(Hf)Cl_4$ (i e. the stability of the double salt) may be adjusted by addition of chlorides such as LiCl and $SrCl_2$ having lower stabilities, or MgCl$_2$ and CaCl$_2$ which do not form stable double salts but rather serve to decrease the stability of the existing double salts in solution. The solubility of Zr(Hf)Cl$_4$, the reactivity of the reagent solution towards the POCl$_3$ complex, and the required temperature for Zr(Hf)Cl$_4$ recovery may therefore all be tuned by adjusting the solvent composition.

An example of this utilizes the LiCl-KCl eutectic mixture, melting at 361C. The relative stabilities of the lithium and potassium double salts are indicated by their decomposition temperatures, defined as the temperature at which the vapor pressure of dissociated ZrCl$_4$ over the pure double salt becomes one atmosphere. For K$_2$ZrCl$_6$, this temperature is 831C, and for Li$_2$ZrCl$_6$ it is only 501C. Because of the considerably greater stability of the potassium double salt than the lithium, chemical equilibrium considerations would indicate that most of the zirconium in solution would exist as K$_2$ZrCl$_6$. However, the presence of the LiCl causes the solubility of ZrCl$_4$ in the solution to decrease over what would be observed in a pure KCl melt at the same temperature, so that a considerably lower temperature than 831C would actually be required to recover ZrCl$_4$ from this eutectic.

FIG. 1 illustrates a typical process using the LiCl-KCl eutectic or near-eutectic salt mixture for recovery of POCl$_3$ and zirconium tetrachloride. The use of this particular mixture in this figure is not intended to limit the extent of this invention to this solvent, as discussed above, since for other operating conditions other mixtures of alkali metal and alkaline earth metal chlorides may be desired. Note also that although the figure indicates processing of the zirconium salt, the process is equally applicable to hafnium salts, or mixtures of the two.

The molten distillation complex ZrCl$_4$,($\frac{1}{3}$)POCl$_3$ is introduced into the top of the displacement reactor via a feed column, above the melting point of approximately 200C and below the complex boiling point of 355–360C; a temperature of 250C is indicated in the example of FIG. 1. Liquid moving down through the feed column 10 contacts POCl3 vapor liberated in the displacement reactor 12. Because of the pseudo-azeotropic nature of this distillation mixture, the incoming feed will not absorb POCl$_3$ beyond the stoichiometric ($\frac{1}{3}$):1 ratio. However, if any vapor-phase ZrCl$_4$, POCl$_3$ escapes from the displacement reactor, it will be reabsorbed by incoming feed and returned to the reactor 12. A condenser may be provided at the top of the feed column 10 to reflux ZrCl$_4$, ($\frac{1}{3}$)POCl$_3$, operating at a temperature between 250 and 360C to reflux the complex, but permitting evolved POCl$_3$ to escape zirconium-free from the system for recycle.

As the ZrCl$_4$, ($\frac{1}{3}$)POCl$_3$ enters the displacement reactor 12, the ZrCl$_4$ enters the liquid phase as double salt complex, liberating vapor-phase POCl$_3$, according to the reactions:

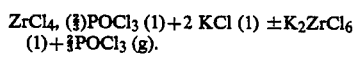

ZrCl$_4$, ($\frac{1}{3}$)POCl$_3$ (1)+2 KCl (1) $\pm$K$_2$ZrCl$_6$
(1)+$\frac{1}{3}$POCl$_3$ (g).

The volume and dilution of zirconium salt in the reagent adjusted to prevent precipitation of excess K$_2$ZrCl$_6$ above the solubility limit. In the example given, the temperature of the displacement reactor 12 might be held at approximately 450C; this would vary as the composition of the reagent were varied.

From this reactor, the solution, largely free of phosphorus, is transferred to a secondary displacement vessel 14, where the temperature is elevated to drive off any remaining POCl$_3$. At the higher temperature (given as 500C in this particular example), some evaporating of ZrCl$_4$ may be expected from the solution, so that the remaining POCl$_3$ has the opportunity of recombining in the vapor phase to form ZrCl$_4$, ($\frac{1}{3}$)POCl$_3$. This stream may therefore contain considerable zirconium and must be scrubbed by the incoming feed. Since the solubilities and capacities of the various alkali metal and alkaline earth chlorides vary, one or more secondary reaction vessels may be required, increasing the reaction temperature until a phosphorus-free melt is obtained.

At this point, the liquid is transferred to the recovery vessel 16. Recovery of ZrCl$_4$ from the molten salt may be done by a number of techniques which are beyond the scope of the present invention. The simplest and most direct technique is shown in FIG. 1, and simply involves further elevation of the temperature and application of a vacuum. Under these conditions, the decomposition pressure of the double salt in solution results in evaporation of ZrCl$_4$. This may be directed as a vapor to a reduction process to produce metal, or may be condensed and collected as the solid tetrachloride. again, the required temperature, degree of vacuum, and reaction time will depend on the particular alkali metal-/alkaline earth chloride mixture used as the displacement reagent. Other processes which may also be utilized for recovery of zirconium or hafnium from the resultant solution include solution-phase metallothermic reduction to zirconium metal, or direct electrowinning of Zr.

After removal of the zirconium value from the solution, the molten salt reagent is returned to the primary displacement reactor 12, with the necessary heat removal. Note that since two streams enter this reactor, the feed stream (at 250C in the example in FIG. 1) and the recycled displacement reagent at a significantly higher temperature (550C in FIG. 1), the net heating or cooling requirement to maintain the desired primary displacement reactor temperature may be rather small.

In all of the displacement and recovery vessels, removal of the vapor-phase species of interest may be assisted by application of a purge gas, either in the gas space above the melt, or sparged into the melt itself below the liquid surface. This purge gas must be dry and inert towards the reagents involved (e.g. nitrogen or argon), and vapor-phase species (POCl$_3$ or Zr(Hf)Cl$_4$).

Lithium (generally in 20–50 mole percent) has been found to be required to lower the melting point of the molten salt (without forming double salts) which interfere with breaking the complex. At least one of the chlorides of Na, K, Rb or Cs (generally in 40–80 mole percent) is needed to form a double salt with Zr(or Hf) Cl$_4$ to break the complex, and all are compatible with recovery by electrolysis. Magnesium and/or calcium chloride are convenient for melting point and vapor pressure adjustment, and can be used in recovery by electrolysis in the manner of the aforementioned related application Ser. No. 242,564.

Thus this is a process for separating phosphorus oxychloride and low-phosphorus zirconium or hafnium tetrachlorides from the complex formed between the two species, using a molten salt displacement reagent consisting of a mixture of alkali metal and alkaline earth chlorides. This recovery is essential to the development of a zirconium-hafnium separations process based on fractionation of the complex. The product of the displacement reaction is suitable for direct thermal recovery of the tetrachlorides, or recovery of zirconium metal via electrolysis or solution-phase reduction.

This invention is not to be construed as limited to the particular examples described herein, as this is to be regarded illustrative, rather than restrictive. The invention is intended to cover all processes which do not depart from the spirit or the scope of the invention.

I claim:

1. A process for recovering zirconium or hafnium chloride from a complex of zirconium or hafnium tetrachloride and phosphorus oxychloride; said process comprising:
   a. introducing liquid complex of zirconium or hafnium tetrachloride and phosphorus oxychloride into an upper portion of a feed column containing zirconium or hafnium tetrachloride vapor and phosphorus oxychloride vapor, said liquid complex absorbing zirconium or hafnium tetrachloride vapor and producing a bottoms liquid and also producing phosphorus oxychloride vapor stripped of zirconium or hafnium tetrachloride;
   b. introducing said bottoms liquid into a molten salt containing displacement reactor, said reactor containing molten salt comprising at least 30 mole percent lithium chloride and at least 30 mole percent of at least one other alkali metal chloride, said reactor being heated to 300–450° C. to displace phosphorous oxychloride from said complex and produce zirconium or hafnium tetrachloride vapor and phosphorus oxychloride vapor and zirconium or hafnium tetrachloride-containing molten salt;
   c. introducing said zirconium or hafnium tetrachloride vapor and said phosphorus oxychloride vapor into said feed column below the point of introduction of the liquid stream;
   d. introducing said zirconium or hafnium tetrachloride containing-molten salt into a recovery vessel where zirconium or hafnium tetrachloride is removed from said molten salt to produce zirconium or hafnium tetrachloride product and zirconium or hafnium chloride-depleted molten salt; and
   e. recycling said zirconium or hafnium tetachloride-depleted molten salt to said displacement reactor.

2. The process of claim 1, wherein a secondary displacement vessel, is used with said zirconium or hafnium tetrachloride-containing molten salt from said displacement reactor being run through said secondary displacement vessel to produce a vapor portion of said zirconium or hafnium tetrachloride and a liquid portion of said zirconium or hafnium tetrachloride containing molten salt, with said vapor portion being recycled to said feed column and said liquid portion being introduced into said recovery vessel.

3. The process of claim 2, wherein zirconium or hafnium tetrachloride is sublimed from said recovery vessel.

4. The process of claim 3, wherein said feed column is operated at about 250° C., said displacement reactor is operated at about 450° C., said secondary displacement vessel is operated as about 500° C., and said recovery vessel is operated at about 550° C.

5. The process of claim 1, wherein said feed column is operated at 200–355° C.

6. The process of claim 1, wherein said recovery vessel is operated at 300–450° C.

7. The process of claim 1, wherein said molten salt consists essentially of lithium chloride, at least one of sodium and potassium chloride, zirconium chloride and up to 30 mole percent of at least one of magnesium and calcium chloride.

8. The process of claim 1, wherein said molten salt contains at least 30 mole percent of at least one of rubidium and cesium chloride.

9. A process for recovering zirconium tetachloride from a complex of zirconium tetrachloride and phosphorus oxychloride; said processing comprising:
   a. introducing a liquid steam of said complex into an upper portion of a feed column phosphorus oxychloride vapor and zirconium tetachloride vapor, to absorb zirconium tetrachloride vapor into said liquid stream and product a bottoms liquid and also product phosphorus oxychloride vapor stripped of zirconium chloride;
   b. introducing said bottoms liquid into a molten salt-containing displacement reactor, said molten salt comprising at least 20 mole percent lithium chloride and at least 40 mole percent of at least one other alkaline earth metal, said reactor being heated to 300–450° C. to displace phosphorus oxychloride and produce phosphorus oxychloride vapor and zirconium tetrachloride vapor, and also produce zirconium tetrachloride-containing molten salt;
   c. introducing said phosphorus oxychloride vapor and said zirconium tetrachloride into said feed column;
   d. introducing said zirconium tetrachloride-containing molten salt into a recovery vessel where zirconium tetrachloride is removed from said molten salt to product zirconium tetrachloride product and zirconium tetrachloride-depleted molten salt;
   e. recycling said zirconium tetrachloride-depleted molten salt to said displacement reactor; and
   f. collecting phosphorus oxychloride vapor stripped of zirconium tetrachloride from said feed column.

* * * * *